United States Patent [19]

Morrison et al.

[11] Patent Number: 5,269,110
[45] Date of Patent: Dec. 14, 1993

[54] FLEXIBLE CLOSURE SYSTEM FOR USE IN BUILDING CONSTRUCTION

[75] Inventors: Richard M. Morrison, Brunswick; George W. Velenovsky, Jr.; Douglas S. Pearmain, both of Auburn; Marcel L. M. Corriveau, Lewiston, all of Me.

[73] Assignee: Schuller International, Inc., Denver, Colo.

[21] Appl. No.: 869,556

[22] Filed: Apr. 15, 1992

[51] Int. Cl.$^5$ .............................. E04B 1/74
[52] U.S. Cl. ........................ 52/396; 52/403; 52/573
[58] Field of Search ............ 52/58, 317, 396, 403, 52/406, 407, 573

[56] References Cited

U.S. PATENT DOCUMENTS

| | | | |
|---|---|---|---|
| 3,300,913 | 1/1967 | Patry et al. | 52/58 |
| 4,173,923 | 11/1979 | Snook | 52/218 |
| 4,465,288 | 8/1984 | Kofoed, Sr. | 52/221 |
| 4,848,044 | 7/1989 | LaRoche et al. | 52/403 |
| 4,866,898 | 9/1989 | LaRoche et al. | 52/403 |
| 4,882,890 | 11/1989 | Rizza | 52/396 |
| 4,977,719 | 12/1990 | LaRoche et al. | 52/403 |

OTHER PUBLICATIONS

Hawley's Condensed Chemical Dictionary, Sax and Lewis, Sr., Sep. 17, 1987 pp. 1039-1040 and 1227-1228.

*Primary Examiner*—Carl D. Friedman
*Assistant Examiner*—Christopher Kent
*Attorney, Agent, or Firm*—Cornelius P. Quinn

[57] ABSTRACT

A flexible closure system seals off and insulates openings in external building walls or roofs where structures such as ducts penetrate the walls or roofs. The flexible closure system also isolates the structures from the walls or roofs by absorbing rather than transmitting vibrations. The flexible closure system includes an exterior rubber closure sheet and an interior silicone coated fiber glass fabric closure sheet which are both coextensive with the opening, secured to the structure and wall or roof, and form a cavity which is filled with glass fiber insulation.

2 Claims, 2 Drawing Sheets

FLEXIBLE CLOSURE SYSTEM FOR USE IN BUILDING CONSTRUCTION

FIELD OF THE INVENTION

This invention relates to a closure system for sealing off an opening between the external wall or roof of a building and a duct, exhaust stack or other structure which penetrates the wall or roof of the building.

BACKGROUND OF THE INVENTION

In commercial building construction such as manufacturing plants, power plants and the like, there typically are numerous places where structures such as exhaust ducts, pipes, exhaust stacks, silos, conveyors, etc. penetrate the external wall or roof of the building, internal walls separating two sections of the same building or a common wall of two buildings. It is desirable to close off the openings surrounding these penetrating structures where they pass through the walls and roofs in order to complete the building envelope and prevent entry into the building of drafts, precipitation, dirt, etc. Furthermore, where noise levels within the building are high such as in power plants, it is desirable, if not a requirement, that the noise levels be reduced within the building envelope so that the noise levels outside of the building meet various codes, regulations and laws. This is especially true where the building is located near a residential area and the noise levels within the building reach a level equivalent to that of a jet engine such as in a power plant.

Many of the structures which penetrate the walls and roofs of these commercial buildings, such as the gas turbine exhaust ducts which are found in power plants, experience multi-directional expansion and contraction, vibration and high operating temperatures of 300 degrees F. or greater. Thus, in addition to sealing the openings between the penetrating structures and the walls and roofs of the buildings and attenuating the noise levels transmitted through the building envelope, it is desirable to isolate the expansion and contraction, vibration and heat of the penetrating structures from the building walls and roofs.

The openings between the penetrating structures and the walls or roofs can take many different configurations. For example, the penetrating structures can be round or rectangular in cross section and the holes in the building walls or roof can be round, square, rectangular or some other configuration required to accommodate a particular situation. Accordingly, if the closure system is to be most effective, the closure system must be readily adaptable to the different opening configurations providing for the complete closure of the openings even where the cross sectional configuration of the penetrating structure and the configuration of the hole in the wall or roof are different.

While typical closure systems used in the trade, such as sheet metal closure systems stuffed with fiber glass, are fairly effective in closing off the openings around penetrating structures, such closure systems have major deficiencies. Such systems are difficult to detail off sight and be assured that the detailed design is properly followed and the system properly installed in the field. With the use of sheet metal, such systems lack the insulating properties that are needed to deaden sound and vibration and to retard the transfer of heat through the closure system. These, prior art systems also lack the flexibility required over a wide range of temperatures to accommodate and isolate the vibrations and expansions and contractions of the penetrating structure from the walls and roof of the building and are a maintenance problem due to the need to periodically caulk such systems for the purpose of keeping such systems weathertight.

BRIEF SUMMARY OF THE INVENTION

The high-temperature, insulated, flexible closure system of the present invention satisfies the above referenced performance requirements for power plants, industrial manufacturing facilities and similar applications. In addition to sealing off the openings around the penetrating structures, the closure system provides thermal and/or acoustical control as well as isolating the vibrations and other movements of the penetrating structures from the building walls and roof.

The flexible closure system of the present invention consists of an outer flexible, reinforced or non-reinforced, rubber bellows sheet capable of operating at continuous temperatures up to 300 degrees F. and an inner flexible, silicone-treated, fiber glass fabric, bellows sheet capable of operating at temperatures up to 500 degrees F. Each of these bellows sheets is attached to a sheet metal flange at its edges. The metal flanges provide a means for securing the closure system to both the penetrating structure and the wall or roof of the building to completely close off the opening between the penetrating structure and the wall or roof.

A cavity is formed between the inner and outer bellows sheets. This cavity is filled with fiber glass insulation to both thermally and acoustically insulate the flexible closure system.

With the closure system of the present invention, the inner and outer bellows sheets and the amount of fiber glass insulation within the cavity can be adjusted at the time of design or manufacture to accommodate different sizes of openings, ranges of movement and different operating requirements. Corners and intersections of the closure system units are more easily manufactured and installed and perform better than other types of closure systems. The bellows materials and the sheet metal flanges of the closure system can be mitered to accommodate any transition at a corner or an angled intersection to make a tight fit which conforms to the configuration of the opening between the penetrating structure and the wall or roof opening. Sections of the closure system can be readily spliced together to form the closure system.

DETAILED DESCRIPTION OF THE INVENTION

Figure 1:
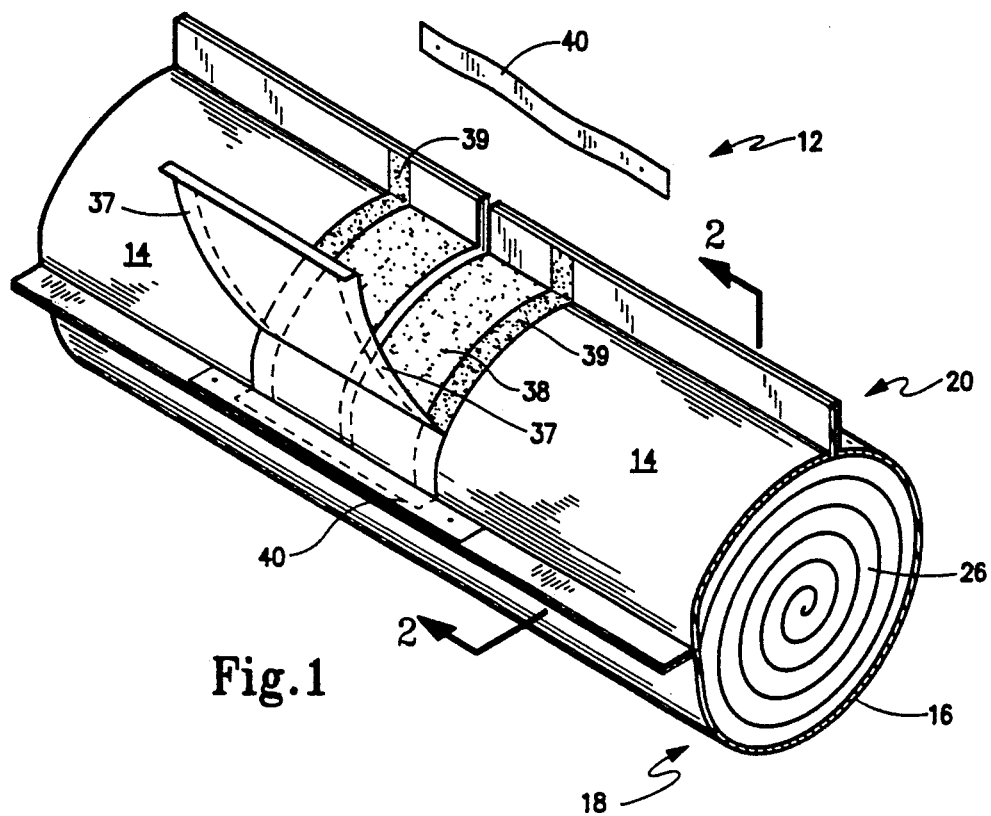
FIG. 1 is a fragmentary perspective view of the flexible closure system of the present invention showing a splice between two sections.
Figure 2:
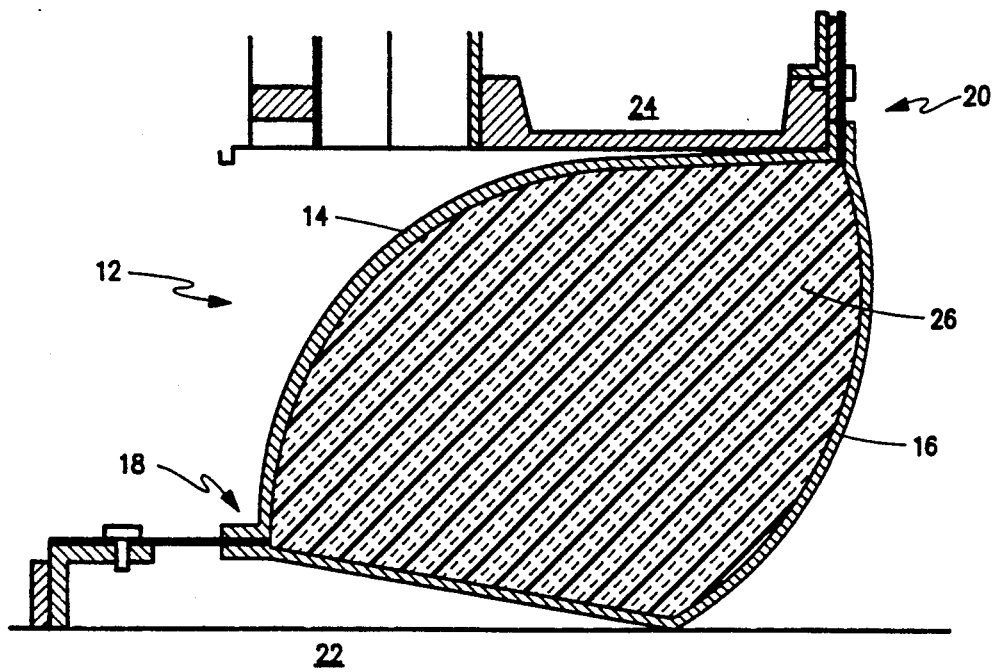
FIG. 2 is a sectional view taken along line 2—2 of FIG. 1 and showing the closure system secured to a penetrating structure and a wall.

Referring to FIGS. 1 and 2, the high-temperature, flexible, insulated closure system 12 of the present invention comprises an exterior, flexible, bellows closure sheet 14 and an interior, flexible, bellows closure sheet 16. The closure system typically comes in sections about ten feet long and while cross sectional dimensions of about twelve to eighteen inches are also typical, the cross sectional dimensions vary as required to fit the opening and to assure that the insulating requirements are met. These closure sheets are each secured to sheet metal flanges, generally designated as 18 and 20, which in turn are secured together and to the penetrating structure 22 on one side and the wall or roof 24 of the building on the other side. The closure sheets 14 and 16 form a cavity therebetween which is filled with flexible insulation 26.

The exterior, flexible, bellows closure sheet 14 is made of a waterproof, elastomeric material capable of operating for extended periods at temperatures up to 300 degrees F. The elastomeric material should also retain its flexibility over a wide temperature range, have good abrasion resistance, and environmental resistance [ozone, oxidation and sunlight have little or no adverse effect on the material]. A preferred material for the exterior, flexible, bellows closure sheet 14 is chlorinated isobutylene isoprene [better known as chlorobutyl]. An example of an acceptable commercially available chlorobutyl sheet is a 0.125 inch thick, 0.71 lb/sq. ft, fiber glass reinforced chlorobutyl rubber sheet manufactured by Thermodyn Corporation. This material will operate for extended periods at 300 degrees F. and will withstand operating temperatures up to 350 degrees F. for short durations or peaks. It is also important that the exterior closure sheet maintain its flexibility at low temperatures and the Thermodyn material has a low temperature brittle point of −40 degrees F. Should a closure system be required to operate for extended periods above 300 degrees F., an elastomeric material such as the fluoroelastomers manufactured by DuPont under the trademark VITON and 3M under the trademark FLUOREL should be considered for use in place of the chlorobutyl material.

The interior, flexible, bellows closure sheet 16 is made of a silicone impregnated fiber glass fabric. This material is capable of performing for extended periods at operating temperatures of up to 500 degrees F. A preferred material for the interior, flexible, bellows closure sheet 16 is a silicone impregnated fiber glass sheet nominally 0.037 inches thick and nominally 0.22 lb/sq. ft manufactured by Alpha Associates Inc., under the trademark ALPHA-MARITEX.

The insulating material 26 which completely fills the cavity between the closure sheets 14 and 16 may be any insulation that performs well at temperatures up to 300 to 500 degrees F., has good sound and vibration absorbing qualities and retains its resiliency. The insulation must be compressible to withstand the compression which may take place as the penetrating structure 22 moves or expands relative to the wall or roof 24 and must be resilient to enable the insulation to recover as the penetrating structure returns to its initial position or contracts. A preferred insulation for temperatures in the 300 to 350 degree F. range is nominally 1⅞ inches thick, typically 0.68 pcf (as supplied), Manville-Schuller MICROLITE L fiber glass insulation in roll form.

As best shown in FIGS. 1 and 2, the sheet metal flanges 18 and 20 for securing the closure sheets together and to the penetrating structure 22 an the wall 24 lie in intersecting planes. In FIG. 2, the sheet metal flange 18 lies in a substantially horizontal plane and the sheet metal flange 20 lies in a substantially vertical plane. In addition to being oriented at an angle of substantially 90 degrees with respect to each other, sheet metal flange 18 is offset from the plane of sheet metal flange 20. Thus, as shown in FIG. 2, sheet metal flange 18 is secured to the penetrating structure 22 at a location offset with respect to the vertical plane of the wall 24 to which sheet metal flange 20 is secured.

Figure 3:
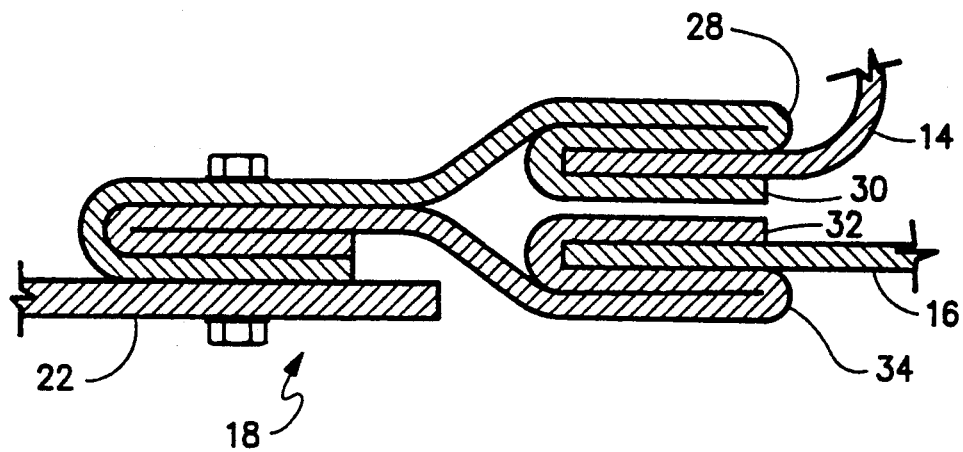
FIG. 3 is a partial enlarged detail of FIG. 2 showing how the bellows closure sheets are attached to the sheet metal flanges.

FIG. 3 is an enlarged detail of the sheet metal flanges 18 which secure one of the side edges of the closure sheets 14 and 16 together and to the penetrating structure 22. A typical sheet metal used for the flanges is 304 stainless steel. While not shown in detail, the sheet metal flanges 20 which secure the opposite side edges of the closure sheets together and to the wall or roof have the same construction. The sheet metal mounting flanges 18 are each fabricated from a single metal sheet which is folded upon itself to form a bifurcated edge for receiving the side edge portion of one of the bellows closure sheets. The bifurcated edge of each sheet metal mounting flange has spaced apart sections 28, 30 and 32, 34 which receive the edge portions of the bellows closure sheets 14 and 16 respectively. A high-temperature adhesive is applied between the edge portions of the closure sheets and the spaced apart sections 28, 30 and 32, 34 and the sections are pressed together to both adhesively and mechanically grip the edge portions of the closure sheets. A preferred high-temperature adhesive for use in securing the exterior closure sheets 14 to the flanges is a general purpose thermosetting adhesive such as one marketed by Ashland Chemicals under the trademark PLIOBOND 30. A preferred high-temperature adhesive for use in securing the interior closure sheets 16 to the flanges is pressure sensitive silicone adhesive such as one marketed by Dow Corning and designated 281 ADHESIVE. If desired, the flange sections can be both crimped and provided with dimples to further enhance the securement of the closure sheets to the sheet metal flanges. These arrangements are shown and discussed in U.S. Pat. Nos. 4,750,301 and 4,848,044, the disclosures of which are incorporated herein by reference. The sheet metal flanges are spot-welded together and are each folded over as shown in FIG. 3 to form a quadruple thickness flange which is secured to the penetrating structure 22 by conventional fastening means.

FIG. 1 shows two sections of the closure system being spliced together. A piece of uncured or unvulcanized rubber exterior bellows, closure sheet material, splice tab 36 is used to splice the sections together. The tab 36 is typically 8 inches wide and overlaps the exterior closure sheets 14 of the two sections of the closure system. The splice tab 36 is adhesively bonded to the exterior bellows closure sheets 14 of each section by an adhesive 38 such as that used to secure the exterior closure sheets 14 to the flanges 18 and 20 and is secured to the sheet metal flanges 18 and 20 by the same adhesive and termination bars 40 which are bolted to the flanges 18 and 20. A primer such as Dow corning 1205 is applied to the areas 37 on the edges of the splice tab 36 facing the exterior closure sheets 14 and extending between flanges 18 and 20. The primer is also applied to adjacent areas 39 of the exterior closure sheets 14. Then the areas 37 of the splice tab 36 and the areas 39 of the exterior closure sheets 14 are caulked with a silicone caulking such as Dow Corning silicone 732. The splice tab 36 then cures insitu to form a flexible, waterproof seal between the sections.

The interior closure sheets 16 of the two sections are joined together in a different manner. The interior closure sheet 16 on each section is about 8 to 12 inches longer than the section on one end so that it extends beyond the end of the section. This flap overlaps the interior closure sheet 16 of the adjacent section but is not secured to the adjacent section.

Figure 4:
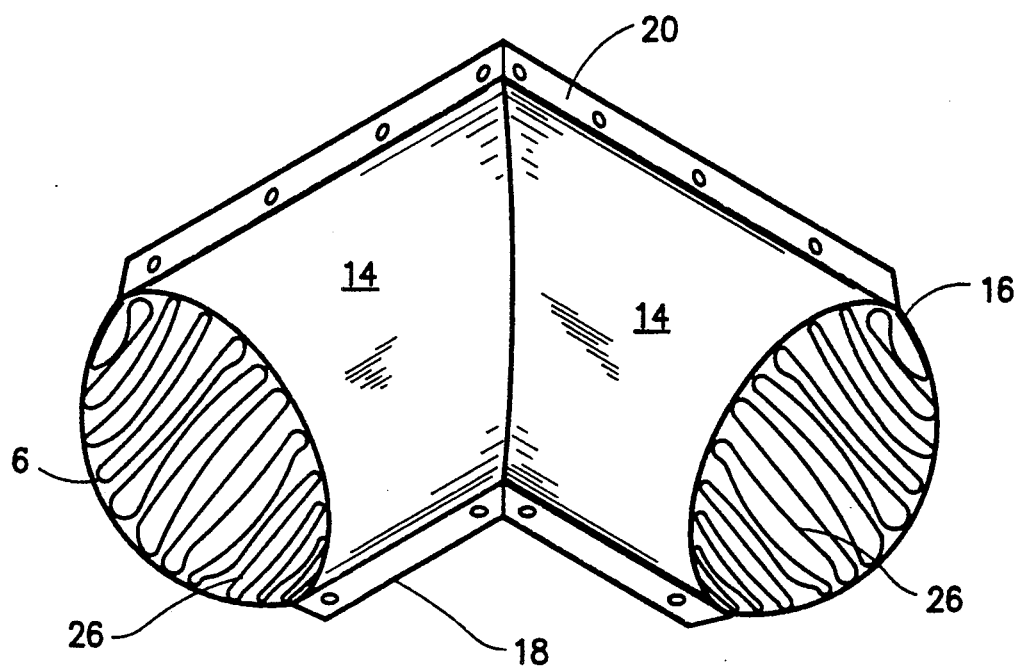
FIG. 4 is a fragmentary perspective view of the flexible closure system of the present invention showing a corner transition.

FIG. 4 shows a typical corner transition. Since the flexible, bellows, closure sheet materials and the sheet metal flanges can both be mitered to accommodate a right angled corner as shown, acute or obtuse angled corners or circular or curved penetrating structures, the high-temperature, flexible closure system of the present invention can be fitted to any opening and can be made to completely cover or seal the opening.

An ASTM E90 airborne sound transmission loss test was performed on a 4 ft. by 4 ft. by 10 inch deep assembly consisting of a single layer of 0.22 lb/sq. ft., Alpha Associates Inc., "ALPHA-MARITEX" silicone impregnated, fiber glass sheet applied over 10 inches of 1.5 pcf (as compacted), Manville-Schuller, "MICROLITE L" fiber glass insulation with a layer of 0.71 lb/sq. ft., Thermodyn Corporation, chlorobutyl coated fiber glass sheet applied over the opposite side of the insulation to simulate the high-temperature, flexible closure system of the present invention. The assembly achieved a Sound Transmission Class (STC) of 44 as computed in accordance with ASTM E413. Thus, for the applications for which the closure system of the present invention is intended, such as power plants, the closure system is highly effective in reducing the noise levels within the building which can reach a level equivalent to that of a jet engine to an acceptable level outside of the building.

TABLE 1

| ⅓ OCTAVE BAND CENTER FREQUENCY, Hz. | SOUND TRANSMISSION LOSS, dB |
|---|---|
| 100 | 14 |
| 125 | 20 |
| 160 | 24 |
| 200 | 29 |
| 250 | 33 |
| 315 | 38 |
| 400 | 43 |
| 500 | 50 |
| 630 | 56 |
| 800 | 60 |
| 1000 | 65 |
| 1250 | 65 |
| 1600 | 63 |
| 2000 | 68 |
| 2500 | 68 |
| 3150 | 63 |
| 4000 | 64 |
| 5000 | 70 |

As shown the high-temperature, flexible closure system of the present invention provides a closure system that can be readily adapted to fit any opening configuration defined by the penetrating structure and the wall or roof opening. The closure system also exhibits the acoustical and thermal performance required for use in high noise level, high temperature applications. With its unique use of a high-temperature, waterproof, weather resistant, flexible exterior closure sheet, a high-temperature, flexible interior closure sheet and flexible, resilient fiber glass insulation, the closure system can completely seal off the opening, operate at high temperatures reducing the heat transfer to the building wall or roof, dampen vibrations so that they are not transferred from the penetrating structure to the building wall or roof and permit relative movement between the penetrating structure and the wall or roof of the building. Thus, the operating parameters for a closure system of this general type are met.

As used in the claims the term wall or walls also means roof.

What we claim is:

1. A flexible closure system for closing off an open space defined by an opening in a building wall and an outer surface of a structure penetrating said wall through said opening, comprising:

a waterproof, flexible, elastomeric exterior closure sheet for extending between and being secured to a building wall adjacent an opening in said wall and an outer surface of a penetrating structure penetrating said wall through said opening whereby said exterior closure sheet is coextensive with an open space defined by said opening and said outer surface of said penetrating structure; said exterior closure sheet being a chlorobutyl rubber coated fiber glass fabric capable of operating at temperatures of 300 degrees Fahrenheit;

a flexible, interior closure sheet for extending between and being secured to said building wall adjacent said opening and said outer surface of said penetrating structure whereby said interior closure sheet is coextensive with said open space; said interior closure sheet being a silicone coated fiber glass fabric capable of operating at temperatures of 500 degrees Fahrenheit;

first means extending in a first plane joining a first set of edges of said exterior closure sheet and said interior closure sheet together and for securing said sheets to said building wall adjacent said opening and second means, offset from said first plane and extending in a second plane intersecting said first plane, joining a second set of edges of said exterior closure sheet and said interior closure sheet together and for securing said sheets to said outer surface of said penetrating structure at a location offset from a plane defined by said wall for permitting movement between said wall and said penetrating structure; said exterior closure sheet and said interior closure sheet defining a cavity therebetween; and a flexible fiber glass insulating material within said cavity for thermally and acoustically insulating said flexible closure system and for absorbing vibrations.

2. The flexible closure system of claim 1, wherein: said first and said second planes intersect each other at substantially a 90 degree angle.

* * * * *